June 22, 1948.   J. JOHNSON   2,443,826
APPARATUS FOR THE MANUFACTURE OF LENSES
Filed Aug. 27, 1945
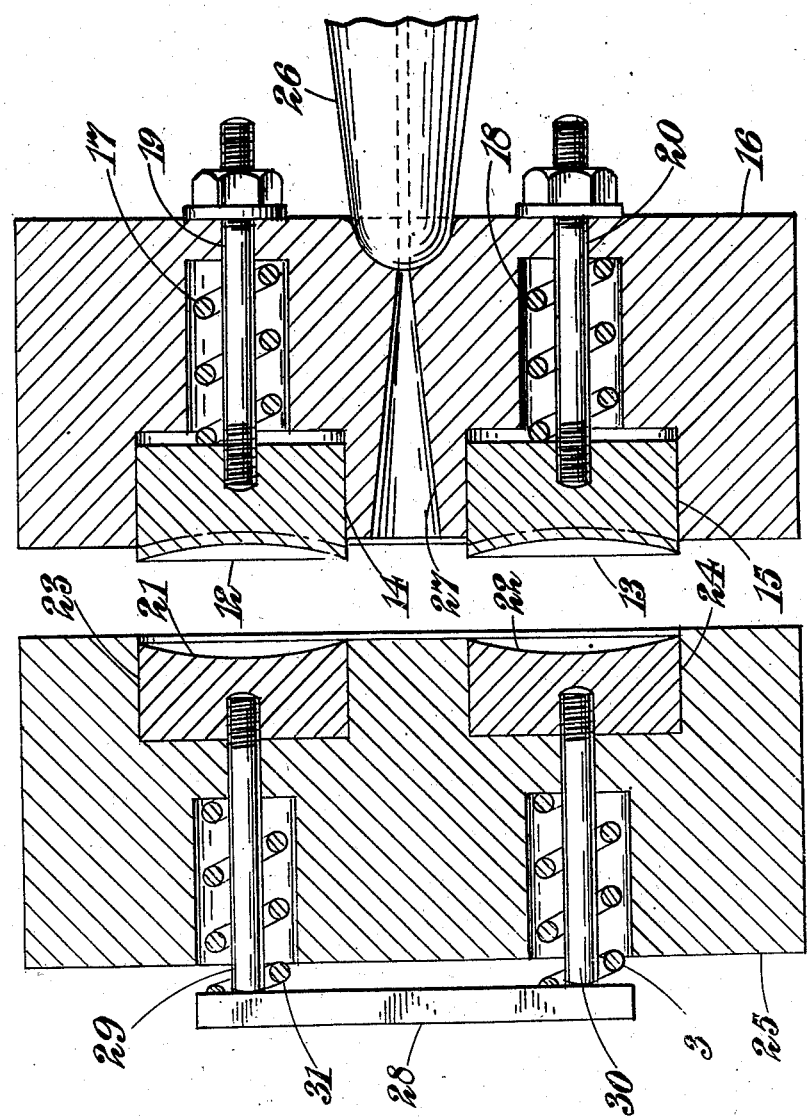
John Johnson
Inventor Patented June 22, 1948

2,443,826

UNITED STATES PATENT OFFICE 2,443,826

APPARATUS FOR THE MANUFACTURE OF LENSES

John Johnson, Slough, England, assignor to Combined Optical Industries Limited, Slough, England, a British company Application August 27, 1945, Serial No. 612,800
In Great Britain June 23, 1944

1 Claim. (Cl. 18—42)

This invention consists of improvements in the manufacture of lenses and the like and has particular reference to the moulding of optical elements such as lenses from transparent thermoplastic material. United States Patent specification Serial No. 346,927, British Patent specification No. 544,472, and United States Patent specifications Serial Nos. 517,944, now Patent No. 2,432,668, and 564,794 describe the moulding of lenses from transparent plastics, but in these prior methods the lens was moulded from a solid blank.

According to this invention lenses are moulded from transparent thermoplastic material in the form of a powder by a process of injection moulding. The powder may conveniently be of methyl methacrylate or of polystyrene.

The injection moulding machine as a whole may be of any standard form having a charging inlet for the moulding powder, a chamber where a charge of moulding powder is heated to the fused, plastic state and a ram which forces the hot plastic through an injection moulding nozzle.

According to this invention the lens mould for an injection moulding apparatus comprises a fixed platen having an inlet conduit which registers with the nozzle of the injection moulding machine and the fixed platen carries two or more dies having optically-accurate exposed surfaces, each of said dies sliding in a socket in the fixed platen against the action of a compression spring while the opposing dies are carried in a platen which is movable to and from the fixed platen. The arrangement is such that when the movable platen is brought into contact with the fixed platen and the hot and mobile plastic is injected between the opposed faces of the dies, the movable dies are forced back to a predetermined distance in the fixed platen so as to form the lenses which solidify on cooling and during the cooling and consequent shrinkage of the moulded lenses, the movable dies maintain the pressure.

According to a feature of the invention the said opposing dies are carried in sockets in the movable platen and are provided with rods extending through the outer face of the movable platen, which rods are connected to an ejector member, whereby the moulded lenses may be ejected by moving the ejector member against the action of the compression springs surrounding the rods between the platen and the ejector member, said springs normally holding the dies in contact with the platen.

In order to provide for lenses of different thicknesses, adjustable stops may be provided for limiting the movement of the dies in the fixed platen.

The nature of this invention and of subsidiary features will be appreciated from the accompanying drawing which is a diagram in central section of the lens moulding devices (with part of the nozzle of an injection moulding machine).

Two movable die portions 12 and 13 whose operating faces are optically-accurate matrices for the corresponding lens surface are slidably mounted in sockets 14 and 15 in a fixed platen 16 and the back of the die portions 12 and 13 are in contact with the compression springs 17 and 18 housed in the platen 16. Conveniently the die portions 12 and 13 have guide rods 19 and 20 projecting back through the platen 16.

The opposing die portions 21 and 22 (also optically-accurate matrices) are housed in sockets 23, 24 in an axially-movable platen 25 and the die portions 21 and 22 do not move in their sockets during the moulding operation.

In the diagram the movable platen 25 is shown in its retracted position and before a moulding operation begins, the movable platen is brought up into contact with the fixed platen 16 and the annular contacting faces near the periphery make a close fit. The nozzle 26 of the injection-moulding machine is in register with a conduit 27 passing axially through the centre of the fixed platen 16 and in the example shown the conduit is flared outwardly from its inlet end to its outlet end. At the centre of the platens 16, 25 their inner faces are cut away or channelled to allow the fused and mobile plastic to pass between the die portions 12 and 21 and between the die portions 13 and 22. The injection moulding takes place in the normal manner with this important distinction, that the die portions 12 and 13 during the injection of the plastic are forced back against the action of the springs 17 and 18. In order to determine with precision the thickness of the resulting lenses, the movement of the die portions 12 and 13 in their sockets may be limited by stops. In the diagram it is assumed that the mould shown is intended for the mass production of lenses of a standard thickness and the stops in this case are simply the annular bases of the sockets 14 and 15.

No cooling arrangements are shown in the diagram and in fact the apparatus will operate with the cooling effect of the metal of the dies and other parts; but if desired cooling devices such as conduits for cold water may be provided (conveniently in the platens around the dies). In fact it is within the scope of this invention to add to the apparatus both heating and cooling arrangements of the type described in patent application Serial No. 564,794.

The means for moving the platen 25 are not illustrated in the diagram but are of standard form. At the back of the moving platen is an ejector 28 having push rods 29 and 30 and springs 31 and 32 so that when the moving platen is retracted as shown in the diagram, the ejector 28 may be pushed towards the platen 25 to eject the finished lenses.

The apparatus of this example is particularly suitable for low-powered spectacle lenses (up to plus or minus three dioptres).

I claim:

A lens mould for an injection moulding apparatus comprising a fixed platen having an inlet conduit which registers with the nozzle of the injection machine, and having a plurality of sockets therein, dies within said sockets having optically accurate exposed surfaces, springs carried by the platen and lying behind the dies to urge the same outwardly of said sockets and means for limiting movement of the dies in the opposite direction in combination with a second platen movable to and from said fixed platen, said second platen having sockets therein carrying dies movable relative to said second platen and in register with the dies of the fixed platen and cooperating therewith to form mould cavities when the platens are brought together, rods carried by the dies in the movable platen which project through the outer face of said platen and are connected to an ejector member, springs surrounding said rods and engageable between the movable platen and ejector member to normally urge the dies into contact with the platen, and means for injecting mouldable plastic material between said die members to move the spring pressed die members in the fixed platen against the action of the springs and against the limiting means to form lenses of predetermined thickness.

JOHN JOHNSON.

REFERENCES CITED

The following references are of record in the file of this patent:

UNITED STATES PATENTS

| Number | Name | Date |
|---|---|---|
| 162,233 | Hobbs et al. | Apr. 20, 1875 |
| 1,673,054 | Rosenberger | June 12, 1928 |
| 1,697,741 | Vaughan | Jan. 1, 1929 |
| 1,925,496 | Nichols | Sept. 5, 1933 |
| 2,298,429 | Smith | Oct. 13, 1942 |
| 2,333,131 | Tillyer et al. | Nov. 2, 1943 |

FOREIGN PATENTS

| Number | Country | Date |
|---|---|---|
| 357,992 | Great Britain | Sept. 24, 1931 |
| 388,662 | Great Britain | Mar. 2, 1933 |